(No Model.)
P. BECKMAN.
ANTIFRICTION BEARING.
No. 491,401. Patented Feb. 7, 1893.
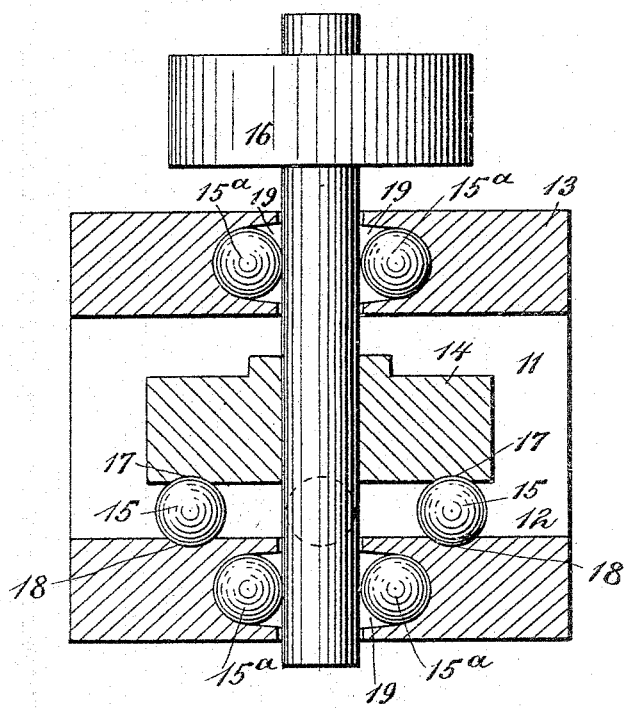
WITNESSES:
W. M. Twitchell.
C. Sedgwick
INVENTOR
P. Beckman
BY Munn & Co.
ATTORNEYS.

UNITED STATES PATENT OFFICE.

PETER BECKMAN, OF BUCKSPORT, MAINE.

ANTIFRICTION-BEARING.

SPECIFICATION forming part of Letters Patent No. 491,401, dated February 7, 1893.

Application filed June 21, 1892. Serial No. 437,451. (No model.)

*To all whom it may concern:*

Be it known that I, PETER BECKMAN, of Bucksport, in the county of Hancock and State of Maine, have invented a new and Improved Antifriction-Bearing, of which the following is a full, clear, and exact description.

My invention relates to improvements in bearings for running shafts, axles, and the like; and the object of my invention is to produce an antifriction bearing which may be applied to almost any moving body, and which will enable the said body to move with very little friction, so little in fact, that oil or other lubricants may be dispensed with.

A further object of the invention is to construct the bearing cheaply so that it will cost no more than an ordinary bearing.

To this end my invention consists in an antifriction bearing, the construction of which will be hereinafter described and claimed.

Reference is to be had to the accompanying drawing, forming a part of this specification, in which the figure is a sectional elevation of a vertical shaft provided with my improved bearing.

As shown in the drawing, the vertical shaft 10 is held to turn in a support 11 having horizontal bearing portions 12 and 13 through which the shaft projects and in which it turns, and on the shaft is fixed a bearing disk 14 beneath the lower face of which and the bearing surface 12, is placed a series of balls 15, four for instance, which travel in the annular grooves 17, 18 in the lower face of the disk and upper face of the bearing portion 12. To prevent lateral thrust or movement, and to still further decrease friction, similar balls 15ª are arranged in annular grooves 19 which are produced in the bearing portions 12 and 13 around the shaft 10.

Having thus described my invention, I claim as new, and desire to secure by Letters Patent:—

The combination with the support 11 having horizontal bearing portions 12, 13 provided with aligned apertures, the walls of which are provided with annular grooves 19, 19; the upper face of the portion 12 having a groove 18 concentric with groove 19, of the vertical shaft extending through the said bearing portions 12, 13, series of balls 15ª in the grooves 19, a disk 14 on the shaft between the portions 12, 13, balls 15 in the annular groove 18 and on which the disk 14 rests, substantially as set forth.

PETER BECKMAN.

Witnesses:
WARREN B. HUTCHINSON,
E. M. CLARK.